G. D. BELCHER.
Improvement in the Construction of Hand-Vises.
No. 131,326. Patented Sep. 17, 1872.
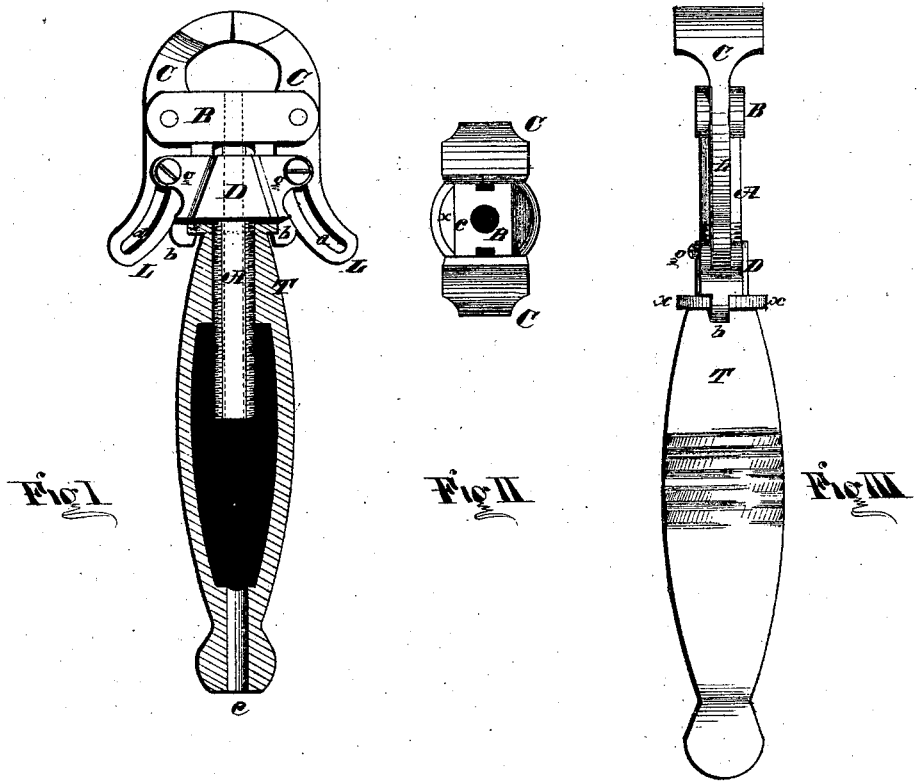

UNITED STATES PATENT OFFICE.

GEORGE D. BELCHER, OF SPRINGFIELD, MASSACHUSETTS, ASSIGNOR TO HIMSELF AND CHARLES E. BELCHER, OF SAME PLACE.

IMPROVEMENT IN THE CONSTRUCTION OF HAND-VISES.

Specification forming part of Letters Patent No. 131,326, dated September 17, 1872.

*To all whom it may concern:*

Be it known that I, GEORGE D. BELCHER, of Springfield, Hampden county, State of Massachusetts, have invented a new and Improved "Hand-Vise," of which the following is a specification:

Nature and Objects of the Invention.

My invention consists, generally, of a screw having a head to afford centers for the two jaws upon each side of it, and working upon it an operating nut or handle provided with a rim at its top, which rim, coming in contact with a collar sleeved upon said screw, and being held to it by hooks proceeding from the collar, causes said collar to follow upon the screw with the rise or fall of the nut-handle, and, by means of the sliding collar, moved against the lower cam surfaces of the wings of the jaws below their centers, the jaws are closed to any required degree, and by pins passing from the collar into cam-slots in the wings the jaws are opened, when the motion of the nut-handle is reversed, and the pins serve to keep the wings always against their bearings on the collars, and the jaws consequently always firm, even when not clamping an object. My invention also relates to providing a passage from beneath the jaws through the screw and handle; the object of this feature in connection with a hand-vise being to enable stock for the formation of screws, pins, &c., to be fed through the vise to the jaws for greater convenience in their manufacture; the object of my improvements being to form a vise that can be readily turned in any direction to finish any article it may hold, and that can be perfectly adjusted without releasing it from the hand.

In the drawing, Figure I is a partial section with the jaws closed. Fig. II is an end view, and Fig. III is a side view with the jaws opened.

General Description.

A is the screw, having the cross-head B, in which are centered the jaws C C. Sleeved upon the screw A is the collar D, which rests upon the rim $x$ of the nut-handle T, while hooks $b\ b$ proceed from it to catch the rim $x$, so that any motion either way upon the screw of the handle T is imparted to the collar. L L are extensions of the jaws, forming wings, and having their lower edges cam-shaped and bearing in a depression in the collar, as seen in Fig. III. In these wings are the cam-slots $d\ d$, into which pass the pins $g\ g$ from the collar D, so that it is evident the motion of the jaws to or from each other is circumscribed by the movement of the collar, imparted to any degree by the movement of the hand-nut or handle T. The aperture $c$ extends, as seen in Fig. II, from immediately beneath the jaws, through the screw and handle, so that wire or other stock can be introduced to the jaws from the other end of the vise.

Now, having described my invention, what I claim is—

In combination with the screw A with its cross-head B, and the handle T with its rim $x$, the collar D with its hooks $b\ b$ and pins $g\ g$, and the slotted wings L L to the jaws C C, the parts being arranged and constructed, as shown and described, to impart motion to the jaws in either direction in the plane of their length while bracing them laterally.

GEORGE D. BELCHER.

Witnesses:
M. P. KNOWLTON,
J. W. BROWNE.